United States Patent [19]

Ricciardi et al.

[11] Patent Number: 4,804,111
[45] Date of Patent: Feb. 14, 1989

[54] MECHANISM FOR METERING SOLID MATERIALS WHICH FLOW IN A MANNER SIMILAR TO LIQUIDS

[75] Inventors: Ronald J. Ricciardi, Woodcliff Lake; Mark Bober, Oakland, both of N.J.

[73] Assignee: Acrison, Inc., Moonachie, N.J.

[21] Appl. No.: 17,268

[22] Filed: Feb. 20, 1987

[51] Int. Cl.⁴ .................. G01F 11/20; G01G 13/00
[52] U.S. Cl. .................................. 222/77; 198/550.1; 198/663; 177/116; 177/145; 222/238; 222/272; 222/368; 222/412
[58] Field of Search ................ 222/77, 226, 227, 236, 222/238, 254, 252, 264, 272, 281, 280, 368, 410–413; 198/663, 548, 550.1; 177/105, 116, 145

[56] References Cited

U.S. PATENT DOCUMENTS

| | | | |
|---|---|---|---|
| 228,950 | 10/1973 | Ricciardi . | |
| 228,951 | 10/1973 | Ricciardi . | |
| 1,288,025 | 12/1918 | Kennedy | 222/412 X |
| 1,490,945 | 4/1924 | Smith | 222/252 |
| 1,668,324 | 5/1928 | Kreisinger | 222/238 X |
| 1,835,989 | 12/1931 | Hofft et al. | 222/238 X |
| 1,842,762 | 1/1932 | Menke | 222/252 |
| 1,957,875 | 5/1934 | Wright | 222/252 X |
| 2,108,999 | 2/1938 | Sisley et al. | 222/252 X |
| 2,161,190 | 6/1939 | Paull | 222/252 |
| 2,615,594 | 10/1952 | Clapp | 222/252 X |
| 2,783,921 | 3/1957 | Stokland | 222/252 |
| 2,804,996 | 9/1957 | Werner et al. | 222/367 X |
| 3,093,270 | 6/1963 | Sarmento et al. | 222/360 |
| 3,118,575 | 1/1964 | McCauley | 222/368 X |
| 3,142,419 | 7/1964 | Burke | 222/413 X |
| 3,145,882 | 8/1964 | Quackenbush | 222/227 |
| 3,289,710 | 12/1966 | Litchard | 222/410 X |
| 3,371,870 | 3/1968 | Harper | 222/252 |
| 3,497,113 | 2/1970 | Braccolino et al. | 222/227 |
| 3,646,689 | 3/1972 | Kuchenthal et al. | 222/238 UX |
| 3,667,654 | 6/1972 | Holley | 222/336 |
| 3,679,101 | 7/1972 | Aldridge | 222/410 X |
| 3,854,627 | 12/1974 | Coons | 222/410 X |
| 3,938,683 | 2/1976 | Bichel | 414/502 |
| 3,999,690 | 12/1976 | Deckler | 222/410 X |
| 4,060,111 | 11/1977 | Burks | 222/252 X |
| 4,165,823 | 8/1979 | Olsson | 222/368 X |
| 4,492,321 | 1/1985 | Zoltner | 222/410 |
| 4,494,678 | 1/1985 | Klein | 222/77 |
| 4,579,252 | 4/1986 | Wilson et al. | 222/77 X |
| 4,619,381 | 10/1986 | Wurtz | 222/412 X |
| 4,722,456 | 2/1988 | Laidlaw et al. | 222/77 X |

FOREIGN PATENT DOCUMENTS 402011 4/1964 Australia .
926355 5/1973 Canada .

Primary Examiner—Kevin P. Shaver
Attorney, Agent, or Firm—Davis Hoxie Faithfull & Hapgood

[57] ABSTRACT

An improved metering mechanism for metering highly aerated or fluidized solid materials in a controlled manner is disclosed. The mechanism consists of a bin discharger attached above a rotary feeder assembly. The bin discharger has two augers which rotate in opposite directions relative to one another. The augers rotate such that material flow is directed toward the center of the discharger, and down into the inlet of the rotary feeder assembly. The rotary feeder assembly contains 6–12 rotary vanes. Two vanes form a pocket into which material falls as each pocket comes into mating relation with the rotary feeder assembly inlet. A tight clearance between the outer radial edge of the rotary vanes and the inner surface of the housing of the rotary feeder assembly prevents the material from flushing through the rotary feeder assembly in an uncontrolled fashion. The material exits the rotary feeder assembly as each filled pocket comes into mating relation with the outlet of the rotary feeder assembly.

11 Claims, 5 Drawing Sheets

MECHANISM FOR METERING SOLID MATERIALS WHICH FLOW IN A MANNER SIMILAR TO LIQUIDS

FIELD OF THE INVENTION

The present invention is for an improved metering mechanism designed to meter fluidized or highly aerated solid materials which flow in a manner similar to liquids and have a tendency to flush through conventional metering mechanisms in an uncontrolled fashion.

BACKGROUND OF THE INVENTION

Precise metering of dry solid materials which flow similar to liquids, so-called fluidized or "floodable" solid materials, is an important but difficult task in many industrial applications and processes. Whenever such a fluidized solid material is continuously fed from a supply vessel of some sort into a production line, the rate at which material is metered to the process must be controlled, just as with any other material used as an ingredient or additive in a continuous or batch process.

However, these highly aerated or fluidized dry solid materials tend to flush through conventional metering mechanisms, preventing controlled feeding of the material into a process or production line. For example, many dry solid materials such as starch, cement, fly ash, stucco and cocoa, as well as a wide assortment of other fine, powdery products, have a tendency to become "fluid" and are difficult to control or meter after having been pneumatically transferred (where air is used as the conveying means) from one place to another. A typical example of this would be when such products are unloaded from a transport vehicle (rail car, ship, truck, etc) and into a storage hopper or silo. Until such time as the air entrapped within the material is dissipated, the material is generally very fluid and extremely difficult to handle or meter.

Another typical example would be when air is intentionally introduced into a dry solid material (when such material is stored in a hopper or silo) in order to promote the flow or discharge of the product when the product bridges or arches in the storage vessel and will not flow.

Another example of this problem includes the situation when gases are generated by the stored material itself due to a chemical reaction in progress. In fact, certain dry solid materials become very fluid at elevated temperatures because of gaseous emissions, resulting in similar materials-handling problems. Examples of such materials include hot stucco and lime.

As with other types of materials which must be metered into a continuous or batch process, fluidized solid materials are fed to such processes by one of two basic types of feeding systems - volumetric and gravimetric systems. The problems outlined above regarding the metering of fluidized solid materials are present regardless of whether a volumetric or a gravimetric feeding system is used.

As the name implies, volumetric systems dispense material by volume. They employ a displacement mechanism of some sort (for example an auger mounted below a supply vessel and feeding a fixed volume of material per revolution) operating at a set speed. Volumetric systems cannot always be relied on to produce good results, however, if actual conditions, such as the density, flow and handling characteristics of the materials change during the feeding process.

Where a high degree of accuracy is required, gravimetric systems are employed. These systems, also known as weight feeding systems, monitor their own feeding performance and automatically correct for variations from the desired or set feed rate. Gravimetric systems control the feeding of material by weight, thereby compensating for changes in density and/or irregular product flow characteristics. For this reason, these systems can provide much higher accuracy than volumetric feeders.

For weigh feeding dry solid materials including those that are highly aerated or fluidized, there are generally two types of gravimetric systems used: weigh-belt and loss-in-weight. Typical weigh-belt gravimetric feeding systems measure the weight of the material passing across the weigh-belt during operation, that is, while the belt is dispensing material. This measured weight is compared to an expected or "set" weight, causing the generation of a control signal. While such weigh-belt systems offer good accuracy for many uses, material sometimes accumulates on the belt or other critical components and thereby causes the control system to improperly adjust the feed rate. The problem is compounded if the accumulated material builds-up and then falls-off critical sections of the weighing mechanism causing shifts in the calibration of the scale's 'zero' or calibration setting. Also, because of the flowing nature of the fluidized solid material, it is difficult to reliably keep the material on the belt at all times.

This type of gravimetric system, therefore, while using feedback principles to offer some control, has substantial inherent limitations that can seriously impair the accuracy of the device.

The other type of gravimetric feeding system usable for fluidized solid materials is the loss-in-weight system. A loss-in-weight system is a weigh feeding system in which the gradual decrease in weight of the system caused by the constant release of material from its scale-mounted supply vessel is monitored and compared to an expected decrease in weight to assess performance. Unlike the weigh-belt gravimetric systems, loss-in-weight systems are not affected by material adhering to the critical areas of the weighing mechanism, or a shift in the scale's 'zero' or calibration, since the entire system is weighed continuously. In loss-in-weight systems, a control system continually (or with great frequency) monitors a signal indicating the decreasing total weight of the feed supply vessel and associated feed mechanism and adjusts the feed rate output to maintain an even rate of weight loss over time. If a weight loss amount over a given time period is larger than expected as sensed by the control system, it commands the feeding mechanism to slow down. Similarly, if the weight detected becomes too high, indicating that the weight loss has been less than expected, the control system orders an increase in the material output flow rate to cause the system to catch up with the expected feed.

Representative control systems for loss-in-weight feeding systems are shown and described in United States Re. Patents Nos. 32,101 and 32,102, and the patents cited therein.

Depending upon the accuracy of feed rate desired, volumetric, weigh-belt or loss-in-weight systems are used for feeding fluidized solid materials.

Prior attempts to prevent uncontrolled metering of fluidized solid materials include the use of a metering mechanism consisting of a special screw design or series of screws having an outer diameter sufficiently close to the inner diameter of the housing of the screw or series of screws such that the material cannot flush through the very small gap between the two. However, use of such screws has continued to result in problems because a highly aerated or fluidized solid material still flushes through the core of the screw in an uncontrolled fashion. Also, if a small solid item, such as a pebble, jams in the very small gap between the outer diameter of the screw and the inner diameter of the enclosing metering mechanism, the feeder ceases to operate. This jamming occurs because the special screws are not designed to handle large particle size materials or materials with solid impurities which can lodge in the gap. Further, such screws are difficult to manufacture and are expensive, resulting in an increased cost for the feeding system and replacement parts thereof.

Vibrating hoppers which feed material into a metering mechanism are also used to remove air from the material before the material typically enters the special screws described above. This solution also has problems, primarily for gravimetric systems, because the vibration of the hopper often causes widely fluctuating weight signals and results in inaccurate feeding. Further, a vibrating scale-mounted hopper is not always suited for longevity.

Therefore, there has been a need for a low-cost yet effective mechanism for metering fluidized dry solid materials while preventing the materials from flushing through the metering mechanism in an uncontrolled fashion.

SUMMARY OF THE INVENTION

The present invention is for a metering mechanism for feeding highly aerated or fluidized solid materials in a controlled manner without the material flushing through the mechanism. The mechanism comprises a bin discharger having at least two augers combined with a rotary feeder assembly having at least two rotary vanes.

The rotation of the augers causes materials to flow from within the storage bin above into the bin discharger inlet and to the bin discharger outlet. The augers rotate in opposite directions to one another which produces an optimum flow pattern conducive to product discharge both from within the hopper above and the bin discharger.

From the bin discharger outlet, the material passes to a rotary feeder assembly inlet. Two rotary vanes define a pocket in the rotary feeder assembly. As the vanes rotate, each pocket in turn comes into mating relation with the rotary feeder assembly inlet and fills with material under the influence of gravity. Similarly, the material is fed out of the rotary feeder outlet as each pocket comes into mating relation with the rotary feeder outlet.

The gap between the outer edge of the rotary vanes and the housing of the rotary feeder assembly is usually between 0.008 and 0.030 inches. The vanes generally rotate at a speed between 2 and 30 revolutions per minute.

In a alternate embodiment of the invention, a third auger is mounted in the bin discharger between the two large augers, centrally located at the bottom of the bin discharger. The third auger rotates proportionally to the rotary feeder assembly by reason of either a mechanical linking means or an electronic variable speed drive system. The third auger enhances a positive flow and feed of material into the rotary feeder assembly.

DETAILED DESCRIPTION OF THE INVENTION

Figure 1:
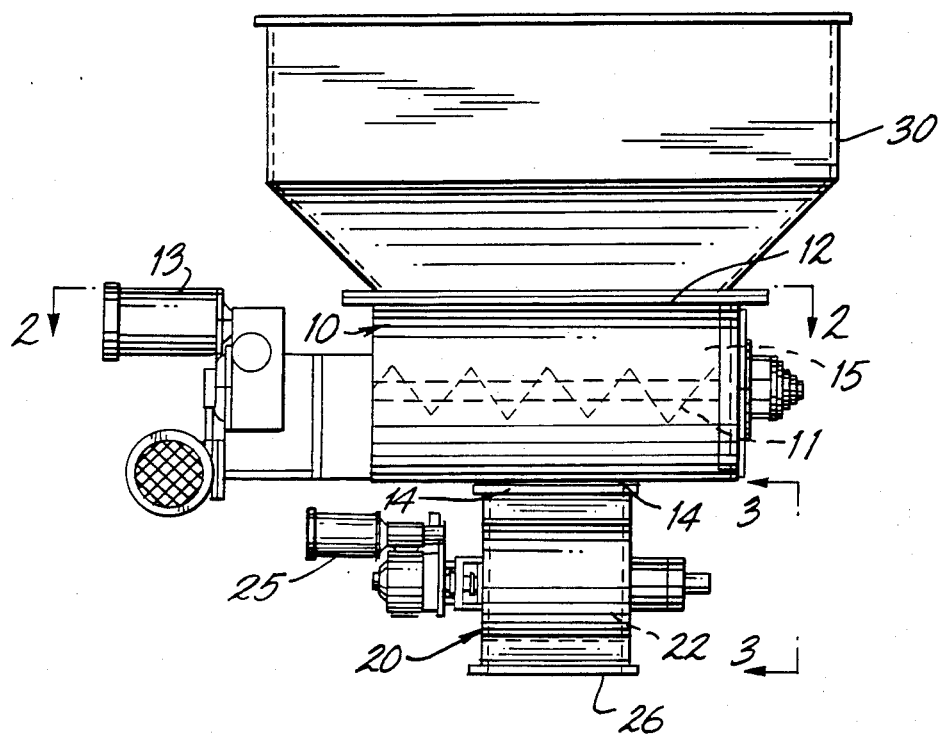
FIG. 1 is a schematic view of a feeding system incorporating the metering mechanism of the present invention including a bin discharger and a rotary feeder assembly.

FIG. 1 shows schematically a portion of a feeding system including a metering mechanism typically for metering fluidized solid materials comprising in combination a bin discharger 10 and a rotary feeder assembly 20. The feeding system may be of the volumetric or gravimetric type.

Figure 5:
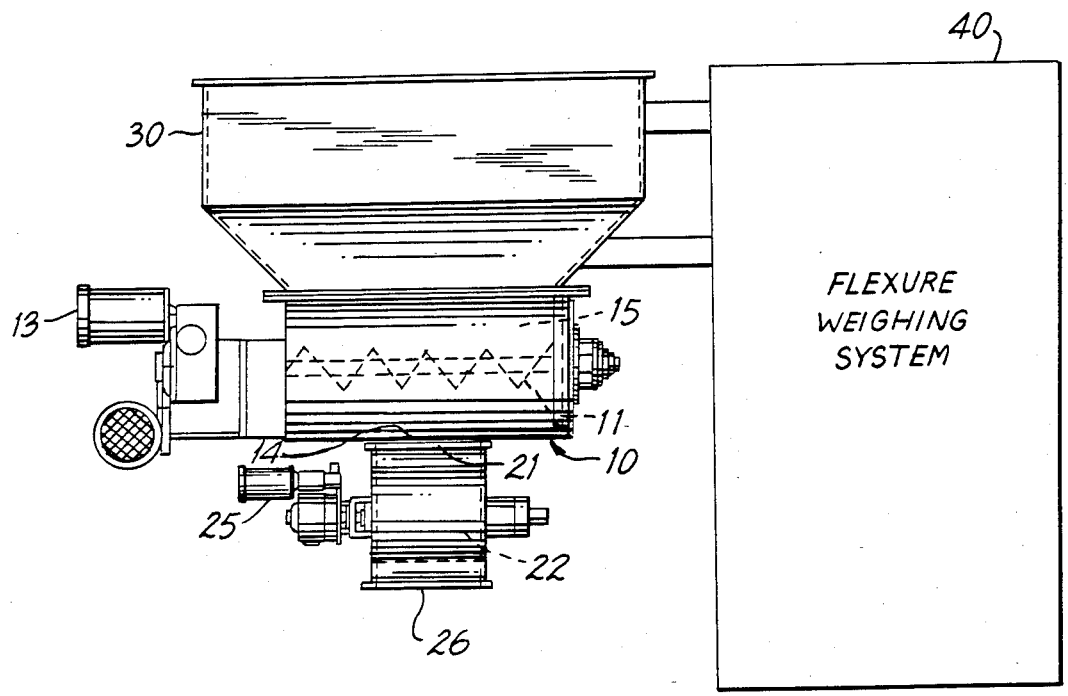
FIG. 5 is a schematic view of the feeding system of FIG. 1 wherein the system is suspended from a flexure weighing system for loss-in-weight operation.

FIG. 5 shows schematically the system of FIG. 1 configured for loss-in-weight operation wherein the feeding system is suspended from a flexure weighing system 40. Such flexure weighing systems are well known in the art. A representative flexure weighing system is shown and described in U.S. Pat. No. 4,042,051.

Referring to the figures, attached to a bin discharger inlet 12 of bin discharger 10 is a storage device, such as a supply hopper 30, which is loaded in a conventional manner with the fluidized solid material to be metered, for example, flowing cement, hot stucco or rock dust. Below a discharger outlet 14 of the bin discharger 10 is the rotary feeder assembly 20.

Figure 2:
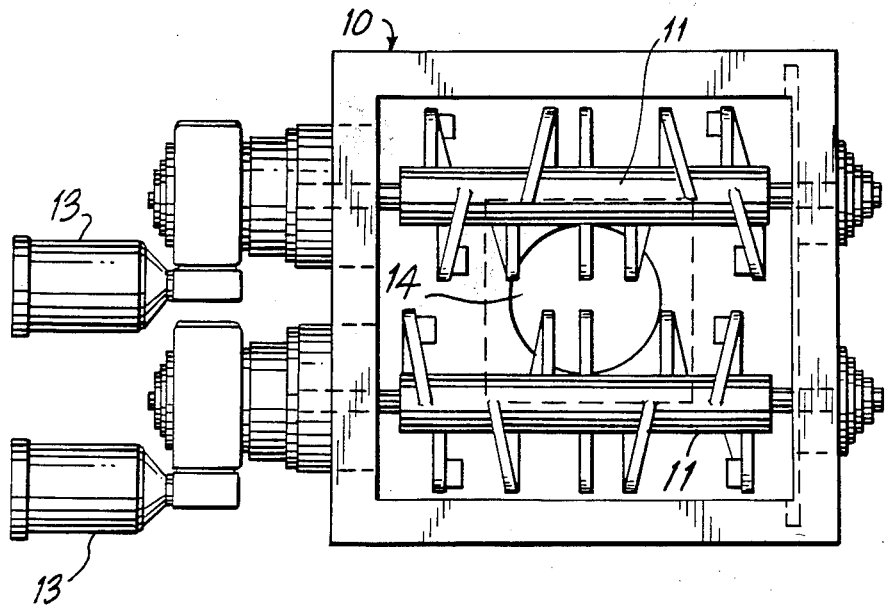
FIG. 2 is a top view of the bin discharger along lines 2—2 of FIG. 1.

The bin discharger inlet 12 leads into a bin discharger chamber 15 of the bin discharger 10. The discharger chamber 15 contains, for example, two large augers or agitators 11 mounted substantially parallel with each other. The augers 11, shown in FIG. 2, are driven by motor 13, each auger 11 typically rotating toward the center of the bin discharger 10 in opposite directions to one another. The bin discharger 10 is of conventional construction and is similar to, for example, bin discharger models no. BD3 and BD4 manufactured by Acrison, Inc., Moonachie, New Jersey, the assignee of the present invention.

Figure 3:
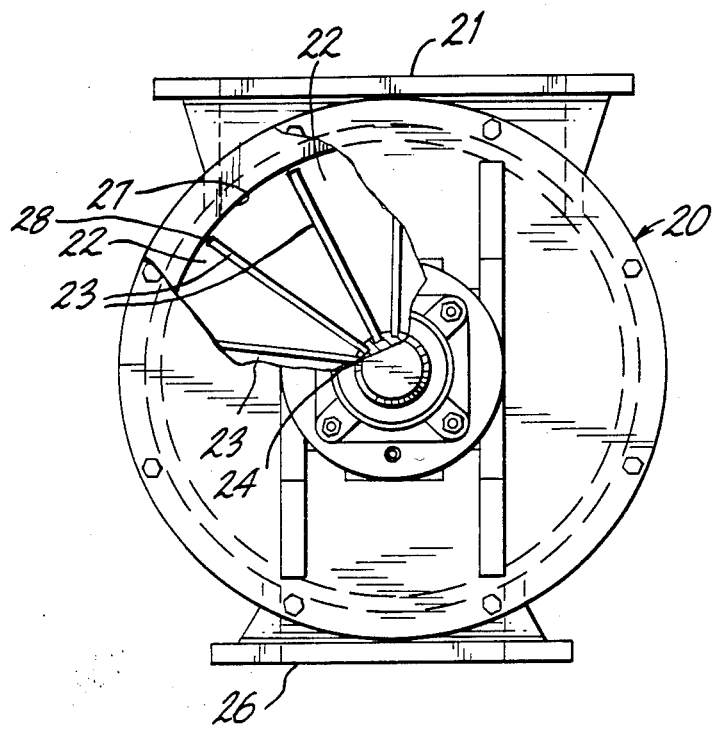
FIG. 3 is an end elevational view, partly in section, of the rotary feeder assembly along lines 3—3 of FIG. 1.
Figure 4:
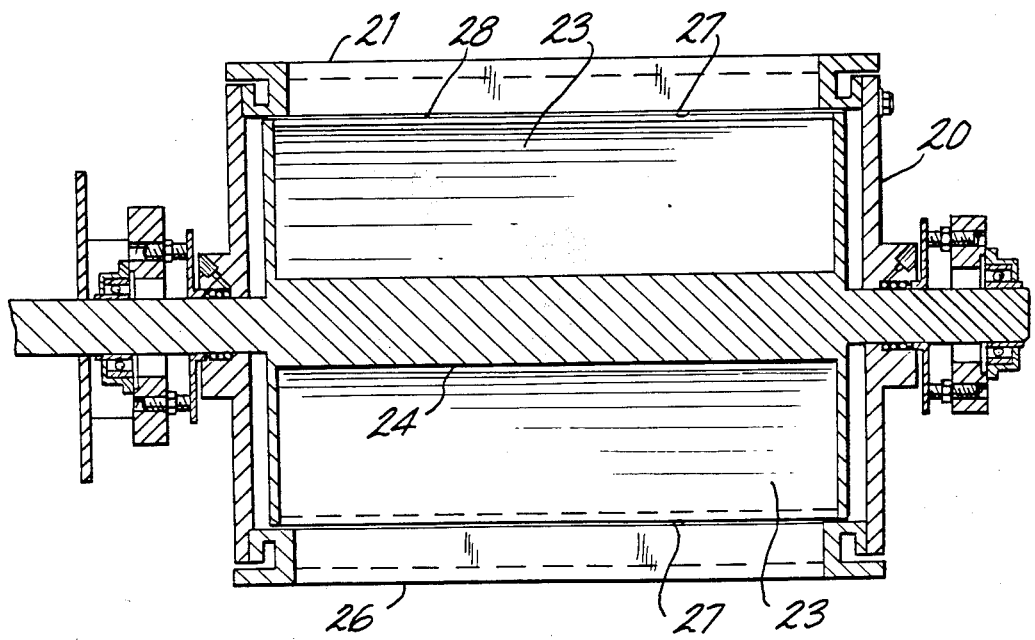
FIG. 4 is a partial sectional view of the rotary feeder assembly of FIG. 1.

The bin discharger chamber 15 leads to the bin discharger outlet 14. The outlet 14 in turn is attached to an inlet 21 of the rotary feeder assembly 20. The rotary feeder assembly has a circular-walled housing 27 with a hollow intermediate segment, having a circular cross-section. The inlet 21 leads to valve pockets 22 in the intermediate segment. Pockets 22 are defined by rotary vanes 23 and the inner surface of housing 27 of the assembly 20. The vanes 23, which typically may number 6-12, are shown in FIGS. 3 and 4 and are attached to, extend radially from, and are equally spaced around the circumference of a rotatable central hub designated as shaft 24 of the assembly 20.

The shaft 24 is mechanically connected to a motor 25. As motor 25 turns shaft 24 in the direction of the arrow of FIG. 3, vanes 23 rotate in the same direction.

The rotary feed chamber 22 leads to a rotary feeder assembly outlet 26, which in turn outputs the material to the process.

The rotary feeder assembly 20 is of conventional construction and, for example, is an Airlock Feeder Model FT Series sold by the Smoot Company, Kansas City, Missouri. The rotary feeder assembly 20 must be constructed of material designed typically to handle abrasive and hot solid materials such as rock dust and fly ash at temperatures ranging from ambient to 800° F. or more.

Between the outer radial edges of the vanes 23 and the inner surface of the housing 27 of the assembly 20 is an annular gap 28, which, for example, is typically in the range of 0.008 to 0.030 inches. As described below, the size of gap 28 plays an important role in preventing the fluidized solid material from flushing through the rotary feeder assembly 20 in an uncontrolled manner.

The metering mechanism of the present invention operates as follows: The fluidized solid material which is to be metered in a controlled fashion is placed in the hopper 30. Under the influence of gravity, and/or gravity assisted by mechanical agitation, the material flows through bin discharger inlet 12 into the feed chamber 15 of the bin discharger 10. When motor 13 is operating, augers 11 rotate, preventing the material from binding or arching within the bin discharger 10 and hopper 30. Augers 11 also cause the material to be fed out of the bin discharger outlet 14 and into the rotary feeder assembly inlet 21.

The augers 11, normally rotating in opposite directions relative to one another, agitate the fluidized solid material and pull the material toward the center of the feed chamber 15 and away from the edges of the bin discharger 10 and into the rotary feeder assembly 20. The augers 11 also direct the material down into the outlet 14 of the bin discharger 10. In this manner, the material is evenly fed into the inlet 21 of the rotary feeder assembly 20.

Motor 25 turns shaft 24 in the direction of the arrow of FIG. 3, causing the vanes 23 to rotate. Of course, motor 25 can also be configured to turn shaft 24 in the direction opposite to that shown in FIG. 3. The material, caused to flow into inlet 21 by augers 11, fills up each pocket 22 of rotary feeder assembly 20 as the pocket comes into mating relation with the inlet 21. Because the gap 28 between the housing 27 of the rotary feeder assembly 20 and the vanes 23 is kept to a minimum, an effective seal results between inlet 21 and outlet 26. The material does not flush through the assembly 20 but instead, feeds out of each pocket 22 as the pocket comes into mating relation with the rotary feeder assembly outlet 26. The material exits outlet 26 in a controlled manner to the production line.

To ensure that solid objects such as pebbles, nuts, or bolts, etc. do not become lodged in the gap 28 and jam the assembly 20, a small baffle or chute (not shown) may be used with the present invention. The baffle or chute directs material flow into the center of each pocket 22, away from the outer edge of each vane 23 as the vanes 23 rotate past the inlet 21 and rotate toward the closed portion of the housing 27.

The bin discharger 10 also performs two other important functions with regard to fluidized solid materials. First, when the metering mechanism is operating at full speed, i.e. while the motor 13 and the motor 25 are running at their set speed, the bin discharger 10 acts to deaerate the fluidized solid material, resulting in the material having less of a tendency to flow like a liquid and thus assisting controlled metering.

Second, after a prolonged shutdown period, with the motors 13 and 25 not operating, most of the air in the material bleeds out, i.e. the material deaerates, resulting in increased densification, often preventing the material from being fed at all. When the feeding system is restarted, the augers 11 agitate the material, creating a looser condition of the material on the bottom of the bin discharger 10. The solid material can never be brought back completely to its fluidized condition after it is deaerated. However, the augers 11 can promote sufficient mass flow and feed for proper system operation after a prolonged shutdown period. The loosening of the deaerated material at the bottom of the discharger 10 by the augers 11 promotes flow out of the bin discharger outlet 14 to the rotary feeder assembly 20.

Thus, the bin discharger 10 performs two important functions at the extremes of operating conditions. First, it helps densify or deaerate fluid material when the system is feeding in a normal fashion. Second, it agitates and loosens up heavily-densified, deaerated material after a prolonged system shutdown. The present invention has the advantage that it can deal with the problems created at either extreme of operation in order to ensure continuity of feeding system performance.

The rotary feeder assembly 20 operates at a fairly slow speed, for example in the range of 2 to 30 revolutions per minute. To increase or decrease the throughput of material, larger or smaller rotary feeder assemblies are available, allowing for maximum flexibility in configuring systems for various feed rates.

Material does not flush through the rotary feeder assembly 20 because of the effective seal maintained from the assembly inlet 21 to its outlet 26, due to the minimal size of gap 28. This allows the precise metering of fluidized solid materials to the production line.

Although both bin discharger 10 and rotary feeder assembly 20 are of conventional construction, and are readily available, the prior art has failed to combine these devices as a solution for the problem of metering fluidized solid materials in a controlled fashion.

Figure 6:
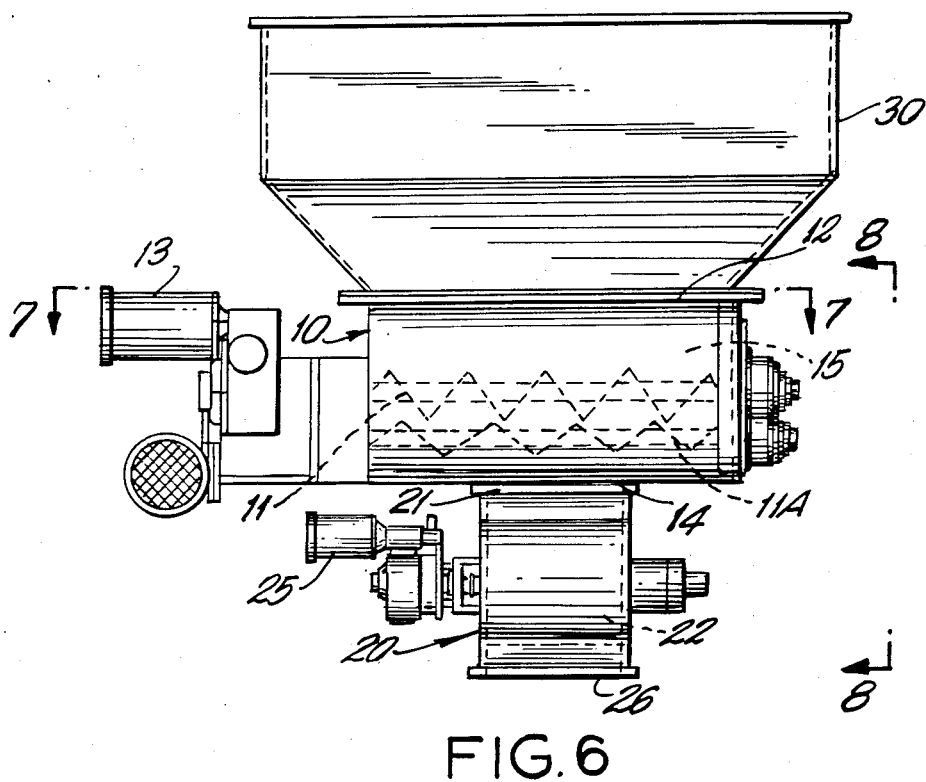
FIG. 6 is a schematic view of a feeding system incorporating an alternate embodiment of a metering mechanism of the present invention including a bin discharger with three augers and a rotary feeder assembly.
Figure 7:
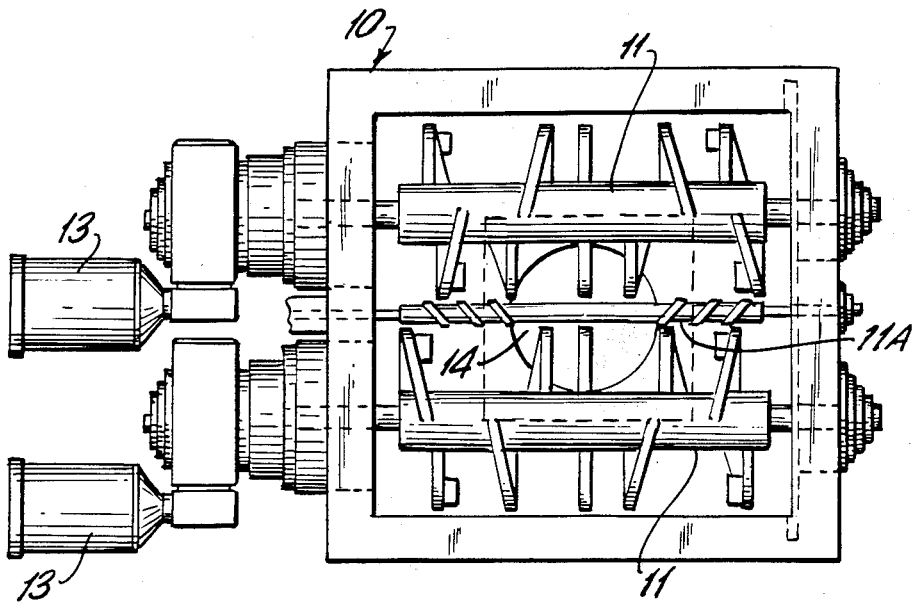
FIG. 7 is a top view of the bin discharger along lines 7—7 of FIG. 6.
Figure 8:
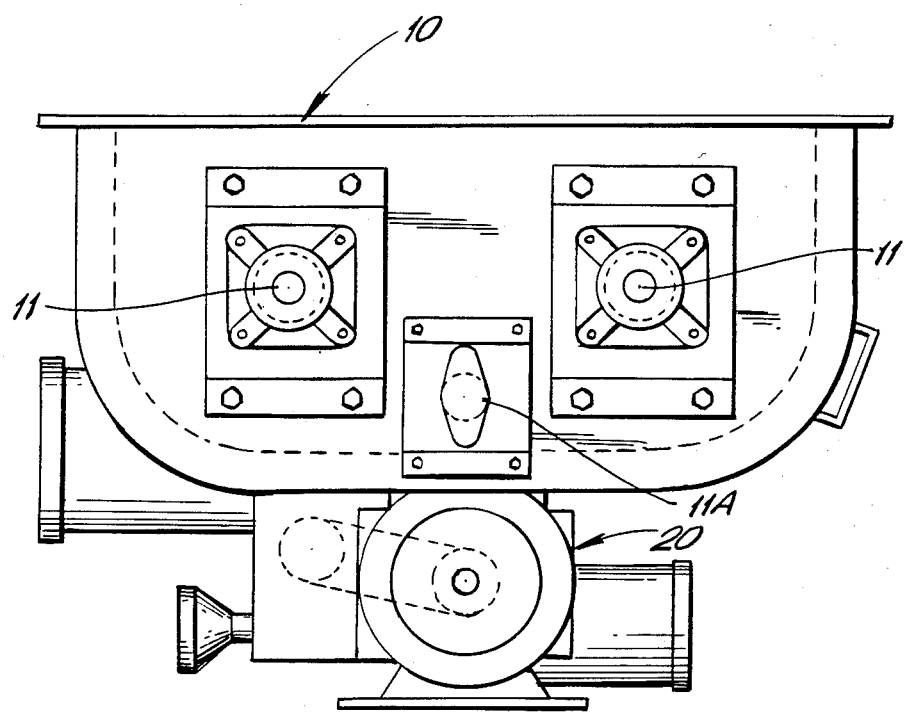
FIG. 8 is an end elevational view of the bin discharger and rotary feeder assembly along lines 8—8 of FIG. 6.

An alternate embodiment of the present invention is shown in FIGS. 6–8, where like numerals identify like parts as identified above in the description of the embodiment shown in FIGS. 1–5.

In this alternate embodiment, a third auger 11A is mounted in the bin discharger 10 below the two augers 11 midway between the two augers 11, as shown in FIG. 8. The diameter of the auger 11A is approximately one-third the diameter of each of the augers 11.

Auger 11A rotates such that material flow toward the center or outlet 14 of the bin discharger chamber 15 and into the rotary feeder 20 is enhanced. In the embodiment shown in FIGS. 1–5, there may exist a "dead zone" between the two augers 11 where the material may stagnate and not easily flow out of the bin discharger chamber 15 and into the rotary feeder 20. The rotation of auger 11A aids in promoting the flow of material in the rotary feeder assembly 20 out of this "dead zone."

Motor 25 of the rotary feeder assembly 20 can also be configured to drive auger 11A so that the speed of the auger 11A and rotary feeder 20 are proportional to each other because of a mechanical linking means. The auger 11A and the shaft 24 of the assembly 20 can also be electrically linked together, typically by utilization of electronic variable speed drives. Alternatively, the auger 11A can have its own drive means separate from the motor 25 so that the auger 11A and the shaft 24 of the assembly 20 are driven independently.

Applicant's invention is not limited to the embodiments described above, but it is understood that applicant's invention is as set forth in the following claims.

We claim:

1. A feeding system having a metering mechanism including a bin discharger for feeding highly aerated or fluidized solid material in a controlled manner from a storage device in combination with a means connected to the feeding system for weighing at least the bin discharger and the solid material in the bin discharger, the metering mechanism comprising the combination of:

the bin discharger having an inlet for receiving material from the storage device, at least two augers mounted substantially parallel with each other, and an outlet;

means for rotating the augers;

a rotary feeder having a housing comprising circular end walls and a hollow intermediate segment having a circular cross-section; an inlet for receiving material from the bin discharger outlet, a rotatable central hub within the intermediate segment of the housing, an outlet, and a plurality of evenly spaced vanes extending radially from the hub into proximity with the inner surface of the intermediate segment of the housing and longitudinally along the hub into proximity with both end walls of the housing, so that each adjacent pair of rotary vanes defines, together with the end walls and intermediate segment of the housing, a pocket; and means for rotating the central hub, whereby each pocket receives material from the bin discharger outlet through the rotary feeder inlet as the vanes rotate and the pocket comes into mating relation with the rotary feeder inlet and whereby each pocket carries the material into mating relation with the rotary feeder outlet.

2. The system of claim 1 wherein the augers of the bin discharger rotate in opposite directions relative to one another.

3. The system of claim 1 wherein the gap between the inner surface of the intermediate segment of the housing and an outer radial edge of each of the rotary vanes is between 0.008 and 0.030 inches.

4. The system of claim 1 wherein the means for weighing weighs the combination of the storage device, the material in the storage device, the metering mechanism and the material in the metering mechanism, whereby the system operates as a loss-in-weight feeding system.

5. The system of claim 1 wherein the rotary feeder hub rotates at a speed between 2 to 30 revolutions per minute.

6. The system of claim 1 also comprising a third auger mounted in the bin discharger below the first auger and the second auger, and means for rotating the third auger.

7. The system of claim 6 also comprising means to enable the third auger to rotate at a speed proportional to the speed of rotation of the central hub of the rotary feeder assembly.

8. The system of claim 6 wherein the diameter of the third auger is approximately one third the diameter of the first auger and the diameter of the second auger.

9. The system of claim 6 wherein the third auger is mounted in the bin discharger between the first auger and the second auger.

10. The system of claim 1 wherein the outlet of the bin discharger is centrally located on the bottom of the bin discharger.

11. A feeding system having a metering mechanism including a bin discharger for feeding highly aerated or fluidized solid material in a controlled manner from a storage device in combination with a means connected to the feeding system for weighing at least the bin discharger and the solid material in the bin discharger, the metering mechanism comprising the combination of:

the bin discharger having an inlet for receiving material from the storage device, a first auger and a second auger mounted substantially parallel with each other, and a third auger mounted below the first auger and the second auger, and an outlet;

means for rotating the first auger;

means for rotating the second auger;

means for rotating the third auger;

a rotary feeder having a housing comprising circular end walls and a hollow intermediate segment having a circular cross-section; an inlet for receiving material from the bin discharger outlet, a rotatable central hub within the intermediate segment of the housing, an outlet, and a plurality of evenly spaced vanes extending radially from the hub into proximity with the inner surface of the intermediate segment of the housing and longitudinally along the hub into proximity with both end walls of the housing, so that each adjacent pair of rotary vanes defines, together with the end walls and intermediate segment of the housing, a pocket; and means for rotating the central hub, whereby each pocket receives material from the bin discharger outlet through the rotary feeder inlet as the vanes rotate and the pocket comes into mating relation with the rotary feeder inlet and whereby each pocket carries the material into mating relation with the rotary feeder outlet.

* * * * *